2 Sheets—Sheet 1.

C. E. DAVIS.

MINING MACHINE.

No. 11,625. Reissued Aug. 10, 1897.

Witnesses.
Wm. H. Rheem.
Wm. F. Henning

Inventor
Charles E. Davis,
by Frances W. Parker,
Atty.

2 Sheets—Sheet 2.

C. E. DAVIS.

MINING MACHINE.

No. 11,625. Reissued Aug. 10, 1897.

Witnesses.

Wm. M. Rheem

Wm. F. Henning

Inventor.

Charles E. Davis by Barnes & Parker

Att'ys.

UNITED STATES PATENT OFFICE.

CHARLES E. DAVIS, OF CHICAGO, ILLINOIS, ASSIGNOR TO THE INDEPENDENT ELECTRIC COMPANY, OF SAME PLACE.

MINING-MACHINE.

SPECIFICATION forming part of Reissued Letters Patent No. 11,625, dated August 10, 1897.

Original No. 583,406, dated May 25, 1897. Application for reissue filed June 30, 1897. Serial No. 643,016.

*To all whom it may concern:*

Be it known that I, CHARLES E. DAVIS, a citizen of the United States, residing at Chicago, in the county of Cook and State of Illinois, have invented certain new and useful Improvements in Mining-Machines, of which the following is a specification.

My invention relates to mining-machines, and has for its object to produce a mining-machine provided with a new and improved feeding mechanism.

The following is a description of my device, reference being had to the accompanying drawings, wherein—

Figure 1:
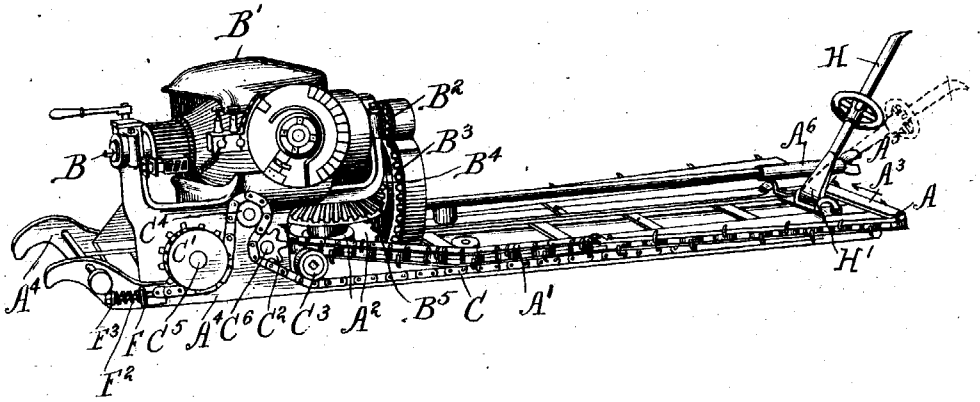
Figure 2:
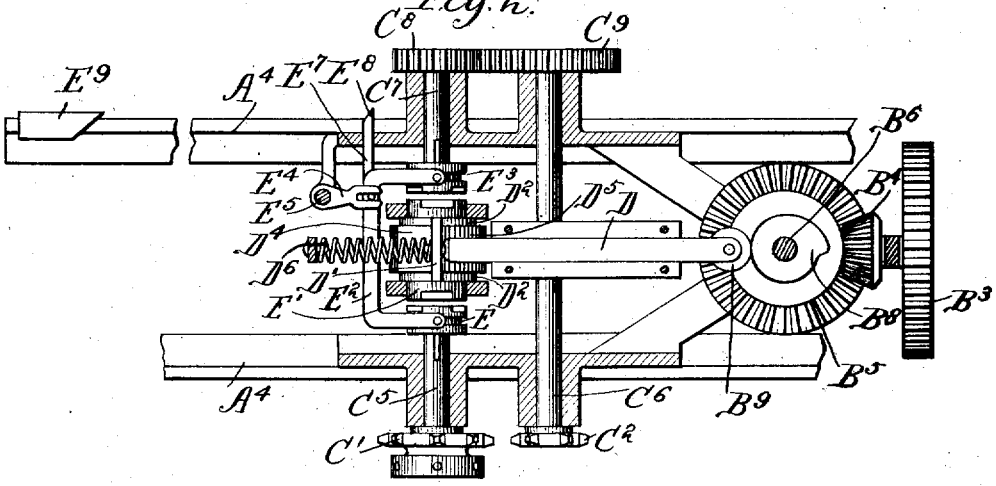
Figure 3:
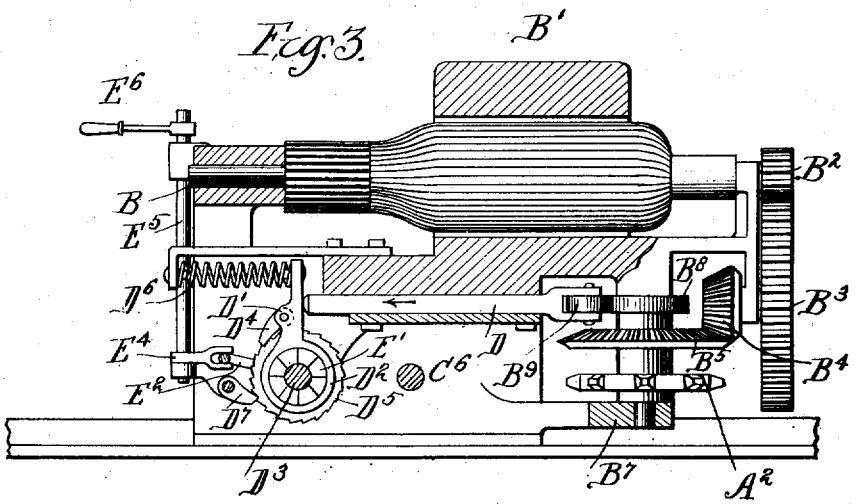
Figure 4:
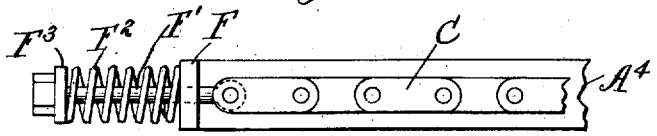

Figure 1 is a perspective view of the entire machine. Fig. 2 is a plan view of the feeding mechanism with motor removed. Fig. 3 is a vertical longitudinal section showing the feeding mechanism. Fig. 4 is a detail.

Like letters refer to like parts throughout the several figures.

Referring to Fig. 1, I have shown here a coal-mining machine that undermines the body of coal by means of the cutting-tools A A on the endless belt A′. This belt works on the sprocket-wheel $A^2$, which derives its motion from the armature-shaft B of the electric motor B′, and also in the groove of the frame $A^3$, which is attached to the frame of the motor B′. The motor B′ and frame $A^3$ are supported upon the guides $A^4$ $A^4$, and are capable of sliding along said guides, so that the motor B′, belt A′, and frame $A^3$ may be fed forward as the coal or other material is cut away by the cutting-tools A.

$A^5$ is an auger working in the sleeve $A^6$, attached to the frame $A^3$, and receives its motion from the motor B′. The bearing or sleeve $A^6$ enters the hole bored by auger $A^5$ as the machine is fed forward and prevents any lateral motion of frame $A^3$. The motor and accompanying parts are fed forward by means of the flexible belt or chain C and sprocket-wheels C′ $C^2$ on shafts $C^3$ $C^4$.

$C^3$ and $C^4$ are idlers to change the direction of the chain. Said chain C is fastened at each end to the guide $A^4$. The sprocket-wheels C′ $C^2$ receive their motion from the armature-shaft B of the motor B′, and as they revolve the motor and accompanying parts move forward or backward, as desired.

A detailed view of the feeding mechanism may be seen in Figs. 2 and 3. The armature-shaft B is provided with a pinion $B^2$, which meshes with the gear $B^3$. On the end of the shaft of the gear-wheel $B^3$ is a beveled pinion $B^4$. Said pinion meshes with the bevel-gear $B^5$ on the shaft $B^6$, to which is fastened the sprocket-wheel $A^2$, that gives motion to the endless belt A′. The shaft $B^6$ works in the bearings $B^7$ $B^7$. Rigid with said shaft is the cam $B^8$, against which bears the roller $B^9$ on the end of the bar D. The other end of said bar bears against the arm D′, fastened to the sleeves $D^2$ $D^2$, which are loose upon the shaft $D^3$. A pawl is attached to the arm D′ and engages the ratchet-wheel $D^5$, rigid on the shaft $D^3$. The expansion-spring $D^6$ keeps the wheel $B^9$ against the cam $B^8$ at all times.

$D^7$ is a pawl that prevents the ratchet-wheel $D^5$ from moving backward. The shaft $C^5$ has a clutch E on one end which slides on a feather and is adapted to engage its counterpart E′ on the shaft $D^3$. The bent rod or lever $E^2$ connects said clutch with a similar clutch $E^3$ on the shaft $C^7$, carrying the pinion $C^8$, which meshes with the gear $C^9$ on the shaft $C^6$. These clutches are controlled in any convenient manner, as by arm $E^4$, rod $E^5$, and handle $E^6$.

A rod $E^7$, which may be integral with the bent rod or lever $E^2$ or attached thereto in any convenient manner, is provided with the beveled end $E^8$.

$E^9$ is a beveled piece attached to the frame of the motor and situated so that when the beveled face $C^8$ on the rod $E^7$ comes in contact with the beveled face of the piece $E^9$ said rod and the clutch E are moved so as to disengage the said clutch from its counterpart E′ and stop the machine.

Fig. 4 is a detailed view of the manner in which the flexible belt or chain C is fastened at each end of the guide $A^4$. A lug F is fastened to said guide and is provided with a hole for the bolt F′, to which the chain or belt C is fastened. A spiral spring $F^2$ is placed between the lug and the washer $F^3$ on said bolt. These springs are used to change the step-by-step feed produced by the cam $B^8$ to a continuous and steady feed. The motion of the cam $B^8$ produces a contraction of the springs $F^2$ $F^2$, the expansion of which causes the said cutting-tools to be fed forward in a continuous and steady manner. The machine is held in position while at work by means of jack-screws placed at each end of the frame carrying the guides $A^4$. The jack-screw H at the front end of the frame is not perpendicular to the cross-pieces of the frame, but is made to project obliquely therefrom—*i. e.*, is bent to one side in any suitable manner, as by being bent at H'. The direction in which this jack-screw is bent depends upon the direction of motion of the cutting-tools A and will be in a direction opposite to the movement of the cutting-tools across the end of the frame $A^3$. This construction allows the machine to be held in position at the beginning of the cut before the auger $A^5$ is far enough advanced to steady the machine. It is evident that these several parts may be varied in form, construction, and arrangement without departing from the spirit of my invention, and I therefore do not wish to be limited to the exact construction shown.

The use and operation of my invention are as follows:

As shown in Fig. 2, the feeding mechanism is out of gear. If now the motor is running and it is desired to feed the motor and its accompanying parts forward, the handle $E^6$ is moved so as to cause the clutch $E^3$ on shaft $C^7$ to engage its counterpart on the shaft $D^5$, to which the ratchet-wheel $D^5$ is attached. The motion of the motor-shaft B' is communicated to the shaft $B^6$ by pinion $B^2$, gear $B^3$, pinion $B^4$, and bevel-gear $B^5$. As the shaft $B^6$ revolves the cam $B^8$ is also revolved, and at every revolution the bar D is moved in the direction of the arrow. Since said bar bears against the arm D' said arm is also moved, and by means of the pawl $D^4$ communicates its motion to the ratchet-wheel $D^5$, and hence shaft $D^3$. This motion is thus conveyed by clutch $E^3$, shaft $C^7$, pinion $C^8$, gear $C^9$, shaft $C^6$ to sprocket-wheel $C^2$, and since said sprocket-wheel engages the flexible belt or chain C the motor and accompanying parts will move forward. The spring $D^6$ keeps the roller $B^9$ against the cam $B^8$ at all times and moves the arm D and pawl $D^4$ backward when said roller strikes the concentric part of the cam. The pawl $E^7$ keeps the ratchet-wheel $D^5$ stationary as the pawl $D^4$ moves backward. If now it is desired to move the motor backward, say to start a new cut, the handle $E^2$ is moved so as to disengage the clutch $E^3$ and bring the clutch E into engagement with its counterpart E'. In this case the motion of the ratchet-wheel $D^5$ is conveyed to the shaft $C^5$, and thence to sprocket-wheel C'. Said sprocket-wheel will be moved in a direction opposite to its former motion, and since it engages the stationary flexible belt or chain C the motor and accompanying parts will be moved backward. The speed of the forward feed depends upon the size of the cam $B^8$, ratchet-wheel $D^5$, pinion $C^8$, gear-wheel, and sprocket-wheel $C^2$. The backward feed depends only on cam $D^8$, ratchet-wheel $D^5$, and sprocket-wheel C'. The speed of backward movement of the motor and accompanying parts will be much greater in practice than the forward feed, as is indicated in the drawings.

The springs $F^2$ $F^2$, as before explained, change the step-by-step feed due to the eccentric movement of the cam $B^8$ into a steady and continuous feed, for as the machine is being fed forward the pressure of the cutting-tools against the bed of coal or other material resists their forward movement, and hence instead of said cutting-tools being moved suddenly forward at each revolution of the cam the springs $F^2$ $F^2$ take up the motion by their contraction and force the cutting-tools forward by their expansion as the coal or other substance is cut away. It will thus be seen that a continuous feed is assured. The bending of the jack-screw H to one side causes the machine to be held in position at the beginning of the cut before the auger $A^5$ has bored a hole of sufficient depth to allow the sleeve $A^6$ to enter and steady the machine.

It will be seen that if the cutting-tools, Fig. 1, are moving across the end of the frame $A^3$ in the direction of the arrow the pressure that they exert against the wall to be undermined will tend to force the frame to one side or in the opposite direction of the arrow. If now the jack-screw H projects in a straight line forward and upward, as indicated in full lines, any motion of the frame to one side will tend to decrease the pressure exerted by the jack-screws and allow the frame to be more easily moved. It is found in practice that under these conditions the machine cannot be satisfactorily held in position at the beginning of the cut without other securing devices. When the jack-screw is bent to one side, as shown in dotted lines in Fig. 1, the pressure effected by the contact of the cutting-tools with the wall to be undermined causes an increase in the pressure exerted by the jack-screw, and hence adds to its holding capacity. It will thus be seen that the machine will be firmly held in position at the beginning of the cut without the aid of other securing devices. When the motor reaches the limit of its backward motion, the end of the rod $E^7$, to which is connected the clutch E, comes in contact with the beveled face of the piece $E^9$ and is moved so as to disengage said clutch and stop the machine. I may also have a similar device at the front of the stationary frame, so as to stop the machine at the limit of its forward movement.

I claim—

1. A feeding mechanism for mining-machines comprising a continuously-rotating motor, a revoluble cam, a bar provided at one end with a roller which bears against said cam, the other end of said bar bearing against an arm carrying a pawl that engages a ratchet-wheel, means for holding said arm and bar in engagement, and two shafts adapted to be alternately connected to the ratchet-wheel and provided with sprocket-wheels that engage a single stationary rack whereby the mining-machine may be moved forward or backward.

2. A mining-machine comprising a motor, a cam, means of communicating the motion of the motor to the cam, connections between the cam and a feeding ratchet-wheel, two shafts carrying sprocket-wheels that engage a stationary chain, a clutch associated with one of said shafts adapted to engage the shaft of the feeding ratchet-wheel and feed the machine in one direction, and a second clutch associated with an auxiliary shaft connected to the second sprocket-wheel shaft and adapted to engage the shaft of the feeding ratchet-wheel and move the machine in an opposite direction at a different speed, substantially as described.

3. A feed mechanism for mining-machines or the like, comprising a revoluble cam, connections between the said cam and a feeding ratchet-wheel, two shafts, each provided with a sprocket-wheel which engages a stationary chain, clutches associated with said shafts and adapted to engage the shaft of the feeding ratchet-wheel, and a controlling-handle connected with both of said clutches, whereby, when the said machine is in operation a movement of said handle in one direction causes the mining-machine to be fed forward, and a movement in the other direction causes said machine to be moved backward, substantially as described.

4. A feeding mechanism for mining-machines comprising a stationary, flexible chain elastically attached to the guides or frame along which the machine moves, a motor and connections between said motor and the flexible chain.

5. A feeding device for mining-machines comprising a revoluble cam, means by which the motion of the cam is communicated to a ratchet-wheel, and a flexible chain elastically attached to some part of the frame of the machine, and connections between said ratchet-wheel and chain, whereby the step-by-step feed due to the cam is converted into a steady continuous feed.

6. In a mining-machine the combination of a cutter-carrier with a motor for driving the same, mechanism for feeding said cutter-carrier bodily against the coal to be cut by a step-by-step motion, an elastic power-transmitting spring connected with the machine so as to be interposed between the cutter-carrier and the step-by-step feeding device.

7. A mining-machine comprising two frames movable with relation to each other, a cutting device connected with one of said frames, a motor also mounted upon one of said frames and adapted to drive said cutter, a rack attached to the other frame by an elastic connection and a connecting mechanism between said rack and motor, whereby the cutter is elastically fed against the coal.

8. In a mining-machine, the combination of a continuously-rotating motor, a cutter-carrying frame with guides along which it moves, and a single flexible chain on the guides, a portion of which is elastic and sprocket-wheels on the moving frame in engagement with the chain, and driving mechanism for said sprockets whereby they are adapted to be alternately operatively rotated in opposite directions, one of said sprockets adapted to travel upon the rack more rapidly than the other, so as to feed the frame forward slowly and withdraw it rapidly.

9. In a mining-machine of the breast-machine type, the combination of a movable frame carrying the cutter-chain, a stationary frame along which said movable frame travels, said stationary frame provided at its forward end with an arm, said arm connected with said frame in such a manner as to project therefrom at a fixed oblique angle in one plane and a variable angle in a second plane at an angle with said first-mentioned plane, the free end of said arm adapted to be brought into contact with some stationary object, substantially as described.

CHARLES E. DAVIS.

Witnesses:
DONALD M. CARTER,
HOMER L. KRAFT.